Patented Jan. 20, 1948

2,434,635

UNITED STATES PATENT OFFICE 2,434,635

PHARMACEUTICAL PREVENTIVE AND REMEDY FOR MOTION SICKNESS

Llewellyn L. Barrow, United States Army, Camp Edwards, Mass.

No Drawing. Application January 20, 1943, Serial No. 472,958

5 Claims. (Cl. 167—55)

(Granted under the act of March 3, 1883, as amended April 30, 1928; 370 O. G. 757)

The invention described herein may be manufactured and used by or for the Government for governmental purposes, without payment to me of any royalty thereon.

This invention relates to a novel pharmaceutical product which is particularly effective in the prophylaxis and treatment of motion sickness.

One object of the invention is to provide a combination of chemical constituents which is highly effective both as a remedy and as a preventive for motion sickness.

Another object of the invention is to provide a remedy or preventive for motion sickness which does not impair the efficiency of the individual using it.

Still another object of the invention is to provide a prophylaxis and treatment for motion sickness which does not diminish in effectiveness with repeated doses.

In the present war, the recent development of combined operation procedures has introduced the problem of motion sickness as an important factor affecting the efficiency of military personnel in landing operations on a hostile shore. In carrying out both land and sea operations, a large portion of the combat troops involved have not had sufficient training on water to accustom them to the motion of various landing crafts, and are therefore landed ashore from these crafts 30% less efficient than when they entered them. In many instances individuals are so affected by motion sickness that they are of no value in carrying out their mission and may in all probability be killed by hostile foe.

With this in mind extensive investigations were begun to determine what might be done to place troops on a hostile shore as free from the symptoms of motion sickness as possible. These investigations comprised extensive research and experimental tests. The research included a review of literature on the subject to determine whether a solution to this problem had been arrived at by other investigators.

As the investigations disclosed that no satisfactory solution had been found, tests were made to determine the incidence of motion sickness in various components of combat forces in an attempt to anticipate which individuals would be incapacitated by the motion of boats. In these tests, an apparatus was constructed to give oscillations in three dimensions with a variable speed device to control the motion in each dimension, in order to simulate closely the motion of landing craft, thus allowing detailed study under controlled conditions.

Investigations which included a study of various combinations of drugs, arrived at empirically, were also made. In this connection, it was noted that drugs usually employed for motion sickness were not applicable in most instances because, to produce the desired result, they impaired the efficiency of the subject.

Throughout the report on these experiments, reference to individuals affected by motion sickness while in boats implies that they exhibited the syndrome characterized chiefly by signs and symptoms, occurring in the following order: sweating, pallor, drowsiness, and nausea and vomiting.

Evidence is present in the literature on the subject of motion sickness which indicates that the vestibular nucleus is the initiator of the train of symptoms which occur in motion sickness. No case was noted in the literature of motion sickness occurring in individuals who did not have intact vestibular systems, and cases are described of individuals with post-meningitic loss of vestibular function in whom motion sickness could not be produced. Once the vestibular mechanism has initiated the syndrome, the subsequent physiological reactions may show great variation.

Certain generalizations were used to interpret the material and to select empirical formulae for therapeutic tests.

1. The so-called "higher psychic function" of the cortex utilized in receiving and interpreting the motion may be a deciding factor in producing symptoms of motion sickness.

Drugs which decrease awareness of environment may, in certain individuals, be sufficient to prevent the onset of symptoms.

2. Inasmuch as the symptoms of motion sickness can be explained for the most part as evidence of autonomic dysfunction, most investigators have assumed that this dysfunction must be prevented if the symptoms are not to occur.

Various investigations and tests showed that two combinations of drugs were most effective in the treatment of motion sickness. A few of these tests are noted below. A group of twelve individuals, previously experiencing proven motion sickness consistently in the boats, were given therapeutic tests of the drugs, and of these only one was not controlled.

Two hundred men of a group which had previously showed an incidence of 12% to 14% motion sickness were given therapeutic tests with the same combination of drugs. The incidence of motion sickness reported was nil.

In another test, two hundred men made a trip of about four hours in open landing craft over a very rough sea. Of these, approximately 20% became definitely motion sick. One hundred of these same men were given the combination of drugs in a different maneuver in which they were on the boats for twelve hours, and only one subject was reported as motion sick.

In none of the above cases has any impairment of efficiency or sensitivity to the drugs been noted.

It has been found from various observations that the incidence of motion sickness varies, depending on the type of boats, condition of the sea, duration of exposure, and acclimation to the motion. For example, a series of tests involving approximately one hundred closely observed cases showed 20% incidence after two hours exposure. In other series of tests run on three hundred individuals in open landing craft after approximately twelve hours showed an incidence of 16%. Another large group consisting of about eight hundred and fifty men exposed for four and one-half hours in open landing craft reported incidence of 12% to 14%. A fourth group consisting of thirty boatmen with approximately three months training in landing craft were exposed for twenty-four hours to the motion of the boat with no incidence of motion sickness.

It has been found that the susceptibility to motion sickness has been increased in closed cabins or covered boats.

The two combinations of drugs administered in these tests and which form subject matter of this application are listed below:

Formula A

| | Grams |
|---|---|
| Sodium iso-amyl ethyl barbiturate | 1 |
| Scopolamine hydrobromide | 1/300 |
| Atropine sulphate | 1/400 |
| Lactose, q. s. ad | V |

Formula B

| | Grams |
|---|---|
| Sodium iso-amyl ethyl barbiturate | 1 |
| Scopolamine hydrobromide | 1/300 |
| Atropine sulphate | 1/400 |
| Amphetamine sulphate | 1/15 |

It will be noted that Formula B is modification of Formula A, in which amphetamine sulphate is substituted for lactose.

The functions of the various ingredients used in Formula A and Formula B are as follows:

Formula A

*sodium iso-amyl ethyl barbiturate; and scopolamine hydrobromide*

These drugs act on the "higher psychic function" of the cortex which is utilized in receiving and interpreting the motion. By this action the awareness of the environment is decreased sufficiently to prevent onset of symptoms of motion sickness. There has been no impairment of efficiency or sensitivity to these drugs noted on the individuals tested.

*Atropine sulphate*

X-ray studies have demonstrated that motion sickness produces atony of the gastric musculature and pylorospasm. As the motion sickness progresses, reverse peristalsis ensues with resulting vomiting or expelling of the contents of the stomach. For this reason atropine sulphate is used because of its action on the anatomical nervous system in relaxing the pyloric sphincter, and to establish a normal gradient or normal peristalsis. There has been no impairment of efficiency or sensitivity to this drug noted on the individuals tested.

*Lactose*

Used as a filler or carrier and has no therapeutic action.

Formula B

As this formula is a modification of Formula A, in which the last ingredient is changed, for an explanation of the functions of ingredients 1 to 3, see the explanation of the same ingredients in Formula A.

*Amphetamine sulphate*

This drug is used synergistically with atropine sulphate in amplifying the effect of the small dose of atropine sulphate on the anatomical nervous system. Atropine sulphate is also included for its slight stimulating effect which may counteract the depressing effect of the previous drugs 1 and 2 (sodium iso-amyl ethyl barbiturate and scopolamine hydrobromide). In small doses it does not have much effect. Drugs 1 and 2, without some offsetting stimulant, may induce a slight depressing effect. This will be offset, however, by atropine sulphate. There has been no impairment of efficiency, or sensitivity to this drug, noted on the individuals tested.

The first two drugs (sodium iso-amyl ethyl barbiturate and scopolamine hydrobromide) act more or less as stabilizing agents.

The fourth ingredient (amphetamine sulphate) is an antidepressant.

Various changes may be made in the details disclosed in the foregoing specification such as a variance in the quantities of the ingredients used or the substitution of drugs having the same or similar functions as those specified without departing from the scope and spirit of the invention or sacrificing the advantages thereof.

Having thus described my invention, what I claim as new and wish to secure by Letters Patent is:

1. A pharmaceutical product, comprising a mixture of 1 part of sodium iso-amyl ethyl barbiturate, 1/300 part of scopolamine hydrobromide, 1/400 part of atropine sulphate, and 5 parts of lactose.

2. A pharmaceutical product for the treatment and prevention of motion sickness including sodium iso-amyl ethyl barbiturate, and scopolamine hydrobromide, adapted to act on that portion of the cortex, utilized in receiving and interpreting motion, whereby the awareness of environment is decreased sufficiently to prevent the onset of symptoms of motion sickness, and atropine sulphate, adapted to relax the pyloric sphincter and establish normal peristalsis.

3. A composition of matter for overcoming and preventing motion sickness by decreasing the awareness to environment, and preventing atony of the gastric musculature and pylorospasm, comprising sodium iso-amyl ethyl barbiturate and scopolamine hydrobromide as the awareness decreasing chemicals, a stimulant consisting of atropine sulphate adapted to counteract the depressing effect of said sodium iso-amyl ethyl barbiturate and scopolamine hydrobromide, and a filler.

4. A composition of matter for overcoming and preventing motion sickness by decreasing the awareness to environment, and preventing atony of the gastric musculature and pylorospasm, comprising sodium iso-amyl ethyl barbiturate and scopolamine hydrobromide as the awareness decreasing chemicals, atropine sulphate as a stimulant to counteract the depressing effect of said sodium iso-amyl ethyl barbiturate and scopolamine hydrobromide and lactose adapted to function as a vehicle.

5. A pharmaceutical product for the treatment and prevention of motion sickness including sodium iso-amyl ethyl barbiturate 1 grain, scopolamine hydrobromide 1/300 grain, and atropine sulphate 1/400 grain.

LLEWELLYN L. BARROW.

REFERENCES CITED

The following references are of record in the file of this patent:

UNITED STATES PATENTS

| Number | Name | Date |
|---|---|---|
| 1,786,873 | Starkenstein | Dec. 30, 1930 |

OTHER REFERENCES

Bohec, Chemical Abstracts, vol. 24, pages 2804, 2805 (1930).

Extra Pharmacopoeia, vol. 1 (1941), page 502.

Wood, Tablet Manufacture (1904), page 43.

Lesser, Drug and Cosmetic Industry, Nov. 1942, vol. 51, pages 527, 528, 529, 585.

Journal of the American Medical Association, vol. 110, page 149 (1938).

Sargent, U. S. Naval Medical Bulletin, vol. 37, July 1939, page 484.

Certificate of Correction

Patent No. 2,434,635.                                                                                 January 20, 1948.

LLEWELLYN L. BARROW

It is hereby certified that errors appear in the printed specification of the above numbered patent requiring correction as follows: Column 3, line 35, "Formula A", and line 42, "Formula B", for the heading "Grams" read *Grains*; and that the said Letters Patent should be read with these corrections therein that the same may conform to the record of the case in the Patent Office.

Signed and sealed this 21st day of September, A. D. 1948.

[SEAL]

THOMAS F. MURPHY,
*Assistant Commissioner of Patents.*